United States Patent [19]

Nalley

[11] 4,204,580

[45] May 27, 1980

[54] FORWARD BIASED SWITCH FOR A REVERSIBLE HAMMER DRILL

[75] Inventor: David J. Nalley, Liberty, S.C.

[73] Assignee: The Singer Company, Stamford, Conn.

[21] Appl. No.: 930,777

[22] Filed: Aug. 3, 1978

[51] Int. Cl.[2] .......................... E02D 7/02; B23B 45/00

[52] U.S. Cl. .................................. 173/48; 200/50 C; 200/157; 173/170

[58] Field of Search ................. 173/48, 170; 200/1 V, 200/50 C, 157; 310/68 A

[56] References Cited

U.S. PATENT DOCUMENTS

| | | | |
|---|---|---|---|
| 3,260,827 | 7/1966 | Frenzel | 200/157 |
| 3,467,801 | 9/1969 | Matthews | 200/157 |
| 3,755,640 | 8/1973 | Kaman et al. | 200/157 |
| 4,097,703 | 6/1978 | Houser | 200/157 |
| 4,097,705 | 6/1978 | Harvell | 200/157 |

*Primary Examiner*—Wm. Carter Reynolds
*Attorney, Agent, or Firm*—Robert E. Smith; Edward L. Bell; Harold Weinstein

[57] ABSTRACT

A hammer drill having a reversible switch which is forward biased normally to prevent the drill from operating in the hammer mode while the switch is in the reverse position. This is a precaution to prevent damage to the clutch teeth which are designed for ratchet action when the tool is operated in the forward direction, but will lock down in reverse to stall tool or damage the mechanism.

4 Claims, 6 Drawing Figures

FORWARD BIASED SWITCH FOR A REVERSIBLE HAMMER DRILL

BACKGROUND OF THE INVENTION

In the prior art hammer drills which were only forwardly rotated used hammering mechanisms without safeguards. However, with the use of reversing switches, which are desirable for the drilling operation, it became neccessary to warn the operator not to use reverse during hammering. A warning is a partial solution, but unfortunately the operator had no restraint against operating the tool in reverse during hammering.

SUMMARY OF THE INVENTION

It is an object of the present invention to provide an improved forward biased reversible hammer drill which overcomes the prior art disadvantages; which provides a positive bias for forward motor operation; which has a reverse switch continuously forward biased; and which permits reverse drilling, but delimits reverse hammering.

Other objects and advantages will be apparent from the following description of the invention and the novel features will be particularly pointed out hereinafter in the claims.

BRIEF DESCRIPTION OF THE DRAWINGS

This invention is illustrated in the accompanying drawings in which.

DESCRIPTION OF THHE INVENTION

Figure 1:
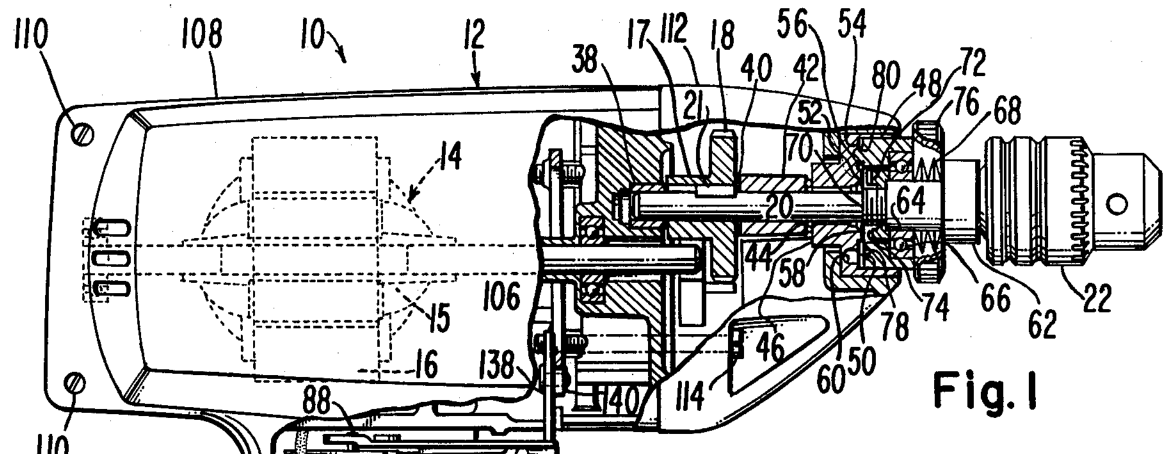
FIG. 1 is a side elevational view of a hammer drill embodying the present invention.
Figure 1:
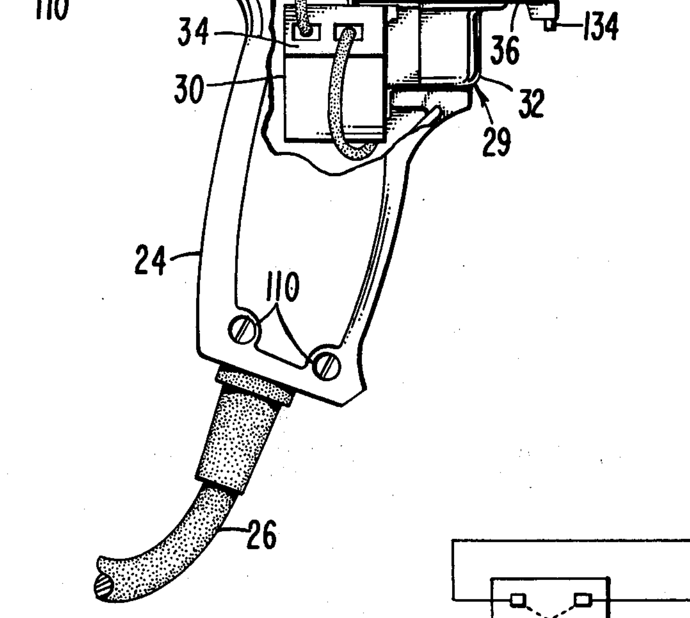

In the illustrated embodiment of the invention, a hammer drill, designated generally 10, is shown in FIG. 1, and has a housing 12 in which is journaled a motor 14 having an armature 15 and a stator field 16 to drive a gear train 17. The last gear of the train is a spindle gear 18 which is affixed to a spindle shaft 20 by a key 21. The spindle 20 extends externally of the housing 12 and has affixed thereto a chuck 22 to which a suitable tool bit (not shown) will be connected to engage the work. The housing 12 has a pistol grip handle 24, the lower end of which receives an electric cord 26 the end of which has a plug 28 shown in FIG. 3 adapted to be connected to a suitable source of electric power. The cord 26 is in circuit with switch assembly 29 including a trigger switch 30 actuated by a trigger 32, and a rotation reversing switch 34 affixed atop the trigger switch 30 and actuated by a pivotal lever 36.

Figure 3:
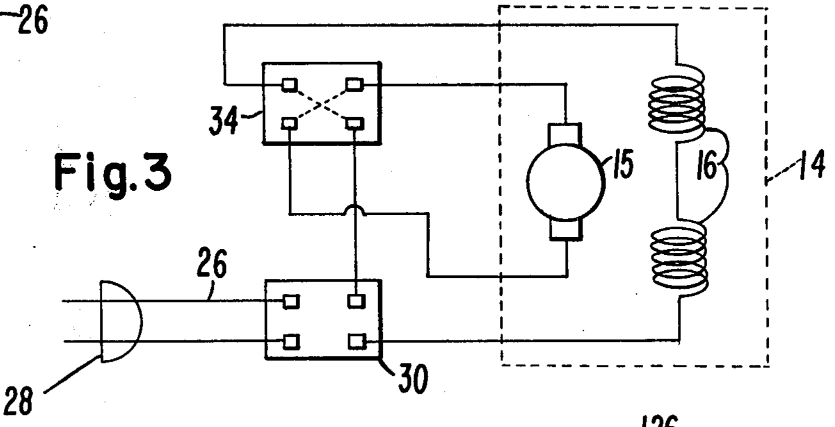
FIG. 3 is a schematic diagram of the electrical circuit of the hammer drill.

FIG. 3 illustrated a schematic diagram for the hammer drill 10 wherein the motor 14, armature 15 and field 16 is controlled via trigger switch 30 for the on-off condition, and rotation reversing switch 34 for forward or reverse rotation of the motor 14. A suitable speed control device (not shown) for controlling the motor 14 speed can be included in circuit integrally connected to or separate from the trigger switch 30, as desired.

Figure 2:
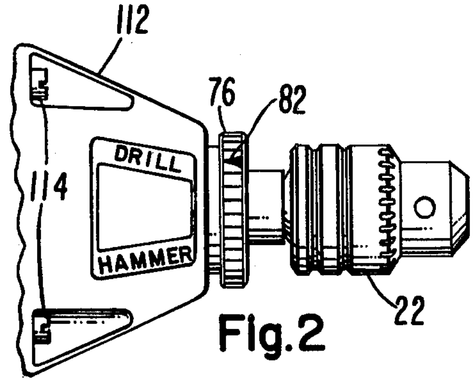
FIG. 2 is a partial top plan view of the front end of the hammer drill showing the selector in the drill setting.

The spindle 20 illustrated in FIG. 1 has a limited axial movement within a needle bearing 38 so that the spindle may be axially shifted between the drill and the hammer positions, and also is free to be axially shifted to partake of the hammering ratchet action during the hammer mode of operation. A washer 40, spacer 42 and thrust bearing 44 are disposed about the spindle 20 forwardly of the spindle gear 18 to abut a stationary ratchet 46 affixed within the nose 48 of the housing 12. The ratchet 46 has a front face 50 fitted with annular angular teeth 52 in spaced relationship to the spindle 20, and radially outwardly thereof is a first aligned drill set surface 54 with holding dimple 56, and a second axially set-back hammering set surface 58 with holding dimple 60. A spindle collar 62 has the chuck 22 abut its outer end, and a journal section 64 is formed inwardly or as viewed in FIG. 1 on the left side of the collar 62. A ball bearing 66 journals the section 64 at its inner end, with a plurality of spring washers 68 disposed between the collar 62 and the bearing 66. A threaded section 70 having left hand threads is formed on the left side of the journal section 64 at a slightly reduced diameter. An annular clutch 72 is connected upon the threaded section 70 to abut the inner race of the bearing 66. Angular teeth 74 face the angular teeth 52 of the ratchet and in the drill setting shown in FIGS. 1 and 2 are held in spaced relationship therewith so that the spindle 20 will only rotate. A set or selector ring 76 is turnably fitted within the stationary ratchet 46 with its enlarged inner end abutting the inner face of the outer race of the bearing 66. The inner or leftward edge 78 has a small projection 80 which will fit within to be yieldably held in one or the other of the dimples 56 or 60. Whenever the operator desires to change the mode of operation from that of drill to that of hammer the ring 76 will be turned to remove the projection 80 from engagement within drill dimple 56 as shown in FIG. 1 to cause the projection 80 to engage the hammer dimple 60 which will produce an inward axial shifting of the ring 76 and spindle 20 to abut the corresponding clutch teeth 74 with the ratchet teeth 52. This change in mode of operation will be visually shown by the indicator 82, shown in FIG. 2, being shifted from its alignment with the "drill" marking to that of the "hammer" marking. The corresponding teeth 52 and 74 are angled to rotate forwardly to produce the ratcheting or hammering effect. The engaged teeth continuously ride over and fall to produce the back and forth axially shifting or "hammering". The forward rotational direction is assumed to be rightward or clockwise rotation. The reverse rotational direction is assumed to be leftward or counterclockwise rotation.

In the event the operator accidentally sets the reversing switch 34 to reverse and the ring 76 to hammer the sets of teeth 52 and 74 will lock down against each other and either stall the motor 14 which could cause it to burn out, or the clutch 72 could be unthreaded from the left hand threads of the section 70 of the spindle 20, or the teeth or other parts of the mechanism could be damaged.

It is the principal purpose of the present invention to require the operator to take positive action to place the reversing switch 34 in the reverse mode of operation and then to automatically restore the reversing switch 34 into the forward mode of operation. This is done, as will be explained in greater detail hereinafter, by continuously biasing the reversing switch 34 in the forward mode of operation.

Figure 4:
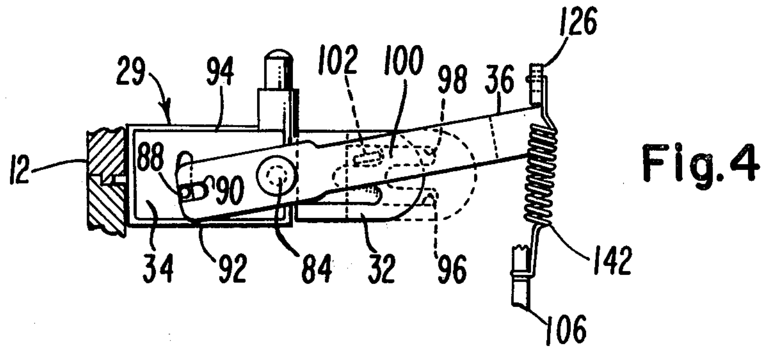
FIG. 4 is a top plan view of the reversing switch and biasing mechanism with the switch in the reversing position.
Figure 5:
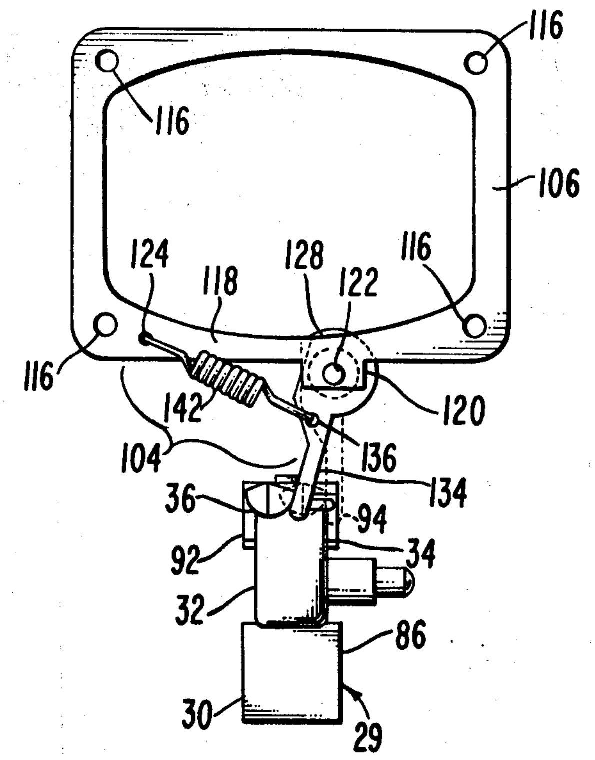
FIG. 5 is a front elevational view of the strip nut carrying the biasing mechanism which biases the reversing switch into the forward position.
Figure 6:
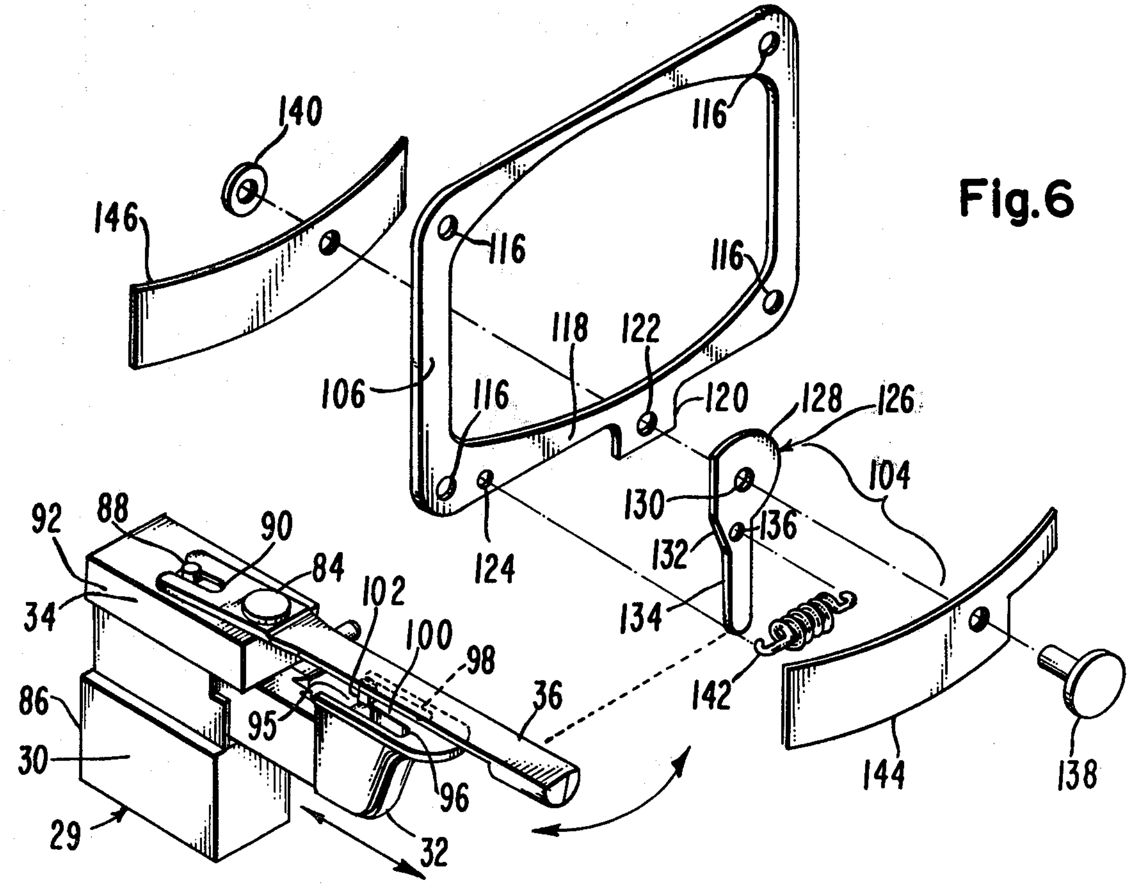
FIG. 6 is a perspective, exploded view of the biasing mechanism, including the reversing switch.

The switch assembly 29, illustrated in FIGS. 1, 4 and 6 has the lever 36 pivotally connected at 84 atop a switch housing 86 in which both switches 30 and 34 are packaged. The forward portion of the lever 36 shown in FIGS. 1 and 6 extends outwardly of the housing 12, above and beyond the trigger 32. The rear of the lever 36 is bifurcated and receives the actuator button 88 of the reversing switch 34 within its slot 90 so that when the lever 36 is moved upwardly as shown in FIG. 4 or rightwardly as shown in FIG. 5 or 6 the actuator button 88 will be adjacent side 92 of housing 86 which will place the reversing switch 34 in the reverse mode of operation. Alternatively placing the lever 36 downwardly as shown in FIG. 4 or leftwardly as shown in FIG. 5 or 6 will position the button 88 adjacent the opposite side 92 of the housing 86 which corresponds to the forward mode of operation of the reversing switch 34.

The trigger 32 has a double recessed slotted top 95 with a forward slot 96 and a reverse slot 98 separated by a partition wall 100 as illustrated in FIGS. 4 and 6. A short pin 102 depends from the lever 36 to be received in the open area of the slotted top 95 when the trigger 32 is in the normal extended position shown in FIGS. 1 and 6. In order to depress the trigger 32 and subsequently actuate the on-off switch 30, the lever 36 must be moved to one side or the other of the trigger 32 before the trigger 32 can be squeezed or depressed. This will align the pin 102 with one or the other of the slots 96 or 98 so as to place the reversing switch 34 via the button 88 in the forward or reverse mode of operation. Prior to the present invention the lever 36 would remain in the last position in which it had been placed. If the selector ring 76 were in the drill position it would not matter whether the lever 36 were in the forward or reverse position. However, when the selector ring 76 is in the hammer position the reversing switch 34 must be in the forward position. A biasing assembly 104, as illustrated in FIGS. 5 and 6 is connected to a strip nut 106 and will continuously urge the lever 36 to assume the forward rotational position regardless of the relative position of the selector ring 76.

The housing 12 shown in FIG. 1 has a motor section 108 which is made up of two clamshell portions interconnected to each other by screws 110. The strip nut 106 is disposed into aligned recesses formed within each of the clamshell portions so that upon the motor section 108 being assembled the strip nut 106 is locked in position therein. A gear head section 112 carries the gear train 17 and the chuck 22 and is connected to the motor section 108 via long screws 114 being threadedly received in the tapped holes 116 of the strip nut 106.

The strip nut 106 is rectangular with a hollow center, and a bottom strip 118 has a downwardly facing projection 120 with a central aperture 122. A hole 124 is formed on the left side of the strip 118 as viewed in FIGS. 5 and 6 adjacent the lower left corner hole 116. A bias member 126 has an enlarged head 128 with a central hole 130 and a flat left side which extends into a sloped intermediate section 132 terminating in a narrow bias finger 132. A hole 136 is formed in the intermediate section 132. A large headed rivet 138 pivotally connects the bias member 126 to the strip 118 by passing through the aligned holes 130, 122 to receive a washer 140 on the inward side of which the rivet shaft is enlarged to prevent its removal. A coil spring 142 has one end connected into the hole 136 of the bias member 126, and the other end connected in the strip hole 124. This urges the finger 134, which as shown in FIGS. 1 and 5 exits the housing 12 to engage the right side of the lever 36, to swing clockwise and force the lever 36 leftwardly to push the button 88 adjacent the side 94, and thus place the reversing switch in the forward mode of operation.

The bias assembly 104 is protected by a front fiber shield 144 and a rear fiber shield 146 placed on either side of the strip 118 and bias member 126 and held in place by the rivet 138.

The bias member 126 acts to manually bias the lever 36 and consequently the reversing switch 34 continuously in the forward mode of operation. Whenever the operator desires to change the rotation of the motor the lever 36 is readily shifted in its normal manner rightwardly as shown is FIGS. 5 and 6 to place the reversing switch in the reverse mode of operation. However, the lever 36 must be held against the bias of the spring 142 as shown in FIG. 4 until the trigger 32 is depressed thus placing the pin 102 within slot 98. The switch 34 will only remain in the reverse mode so long as the trigger 32 remains depressed for once its released the pin 102 is free from the slot 98 and the bias finger 134 acting under the spring force will restore the lever 36 to its forward position as shown in FIG. 5.

This provides a protection against operating the hammer drill 10 in the reverse motor rotation during hammer setting as it requires a positive operator act to place the lever 36 into the reverse position prior to trigger depression. Also, this protects against the operator accidentally setting the tool in the reverse mode of operation during drilling and then when a hammer setting is made forgetting to place the lever 36 for forward motor rotation. The present invention provides for automatic setting of the lever 36 for forward motor rotation.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention what is claimed herein is:

1. A forward biased switch assembly for a reversible hammer drill comprising:

a. a housing,
b. a motor journaled in the housing,
c. a hammer drill mechanism selectively operable as a drill or as a hammer drill,
d. a trigger switch in circuit with the motor to turn the motor on and off,
e. a reversing switch in circuit with the motor and having an actuating button selectively to place switch into the operative positions of forward or reverse,
f. a lever pivotally connected to the reversing switch to shift the actuating button between the forward position and the reverse position,
g. a biasing means including a spring connected in the housing to bias the lever and cause it to urge the actuating button continuously in the forward position whereby the operator is free to manually shift the lever to place the actuating button in the reverse position.

2. The combination claimed in claim 1 wherein:

a. a selector means including a selector ring is positionable between the positions of a drill and hammer drill b. a clutch means in the hammer drill mechanism to be engaged and disengaged by the selector ring whereby when engaged to produce hammer drilling, and c. the clutch operable in the forward position of motor rotation.

3. The combination claimed in claim 2 wherein:

a. a strip nut mounted in the housing above the lever b. a bias member of the bias means pivotally connected to the strip nut to engage one side of the lever, and c. the spring has one end connected to the strip nut and the other end connected to the bias member to urge the bias member in a direction to yieldably force the lever to place the actuating button in the forward position.

4. The combination claimed in claim 3 wherein:

a. a trigger to actuate the trigger switch, b. the trigger having a pair of slots on its top surface, c. a pin extending downwardly from the lever to enter one slot for the forward position and the other slot for the reverse position upon trigger depression to activate the motor in the direction of rotation corresponding to the lever position, and d. the biasing means to shift the lever to the forward position upon release of the trigger.

* * * * *